United States Patent [19]
Kramer et al.

[11] Patent Number: 5,159,224
[45] Date of Patent: Oct. 27, 1992

[54] VIBRATION MOTOR

[75] Inventors: Claus Kramer, Besigheim; Bernd Taubitz, Schwieberdingen; Karl-Heinz Haegele, Vaihingen.Enz, all of Fed. Rep. of Germany

[73] Assignee: Robert Bosch GmbH, Stuttgart, Fed. Rep. of Germany

[21] Appl. No.: 708,650

[22] Filed: May 30, 1991

[30] Foreign Application Priority Data

Aug. 8, 1990 [DE] Fed. Rep. of Germany ....... 4025129

[51] Int. Cl.⁵ ............................................. H01L 41/08
[52] U.S. Cl. ................................................... 310/323
[58] Field of Search ......................................... 310/323

[56] References Cited

U.S. PATENT DOCUMENTS

| | | | |
|---|---|---|---|
| 4,739,212 | 4/1988 | Imasaka et al. | 310/323 |
| 4,755,705 | 7/1988 | Holum | 310/328 |
| 4,771,203 | 9/1988 | Mukohjima et al. | 310/323 |
| 4,924,852 | 5/1990 | Suzuki et al. | 128/4 |
| 4,983,874 | 1/1991 | Yamaguchi | 310/323 |
| 4,989,277 | 2/1991 | Tsutsui et al. | 4/367 |
| 5,049,774 | 9/1991 | Kuwabara et al. | 310/323 |

FOREIGN PATENT DOCUMENTS 3809909 10/1989 Fed. Rep. of Germany .

OTHER PUBLICATIONS

Traveling Wave Ultrasonic Motors Offer, by Y. Ise JEE, Jun. 1986, pp. 66–70.

*Primary Examiner*—Mark O. Budd
*Assistant Examiner*—Thomas M. Dougherty
*Attorney, Agent, or Firm*—Edwin E. Greigg; Ronald E. Greigg

[57] ABSTRACT

A vibration motor having a disk-shaped stator containing a piezoelectric excitation system, a disk-shaped rotor aligned parallel to the stator and mounted on a driven shaft in a manner fixed against relative rotation, and a pressing element that presses the rotor and stator together axially. To assure free travel of the driven shaft when the motor is currentless, the pressing element is embodied as a force-transmitting element that changes shape as a function of temperature, for instance a compression spring of memory metal. In motor operation, the element is kept at a temperature above its temperature point for the shape change, and it is disposed such that the pressing force between the rotor and stator diminishes as a result of the shape change ensuing if the temperature drops below this temperature point.

14 Claims, 3 Drawing Sheets

VIBRATION MOTOR

BACKGROUND OF THE INVENTION

The invention relates to a vibration motor.

Vibration motors of this type are known by various names, such as traveling wave ultrasonic motors, vibration wave motors, and ultrasonic or piezoelectric motors. Exemplary embodiments of such vibration motors are found for instance in U.S. Pat. Nos. 4,771,203; 4,739,212; and 4,755,705; and in the article by Prof. Dr. C. Reuber entitled "Piezo-Wanderwellen-Motor" [Piezoelectric Traveling Wave Motors], Elektronik Journal [Electronics Journal] 23/89, pp. 43 and 44.

In such a vibration motor, the stator is set to vibrating by the piezo excitation system, in the manner of a rotating mechanical traveling wave. By means of the pressure-exerting element, typically embodied as a cup spring, a slipfree connection between the motor and the stator is established, with which the force is transmitted to the rotor, causing it to rotate.

In the currentless state of the motor, the pressure exerted between the rotor and stator for the sake of a slipfree connection blocks the driven shaft, which is connected to the rotor in a manner fixed against relative rotation. Accordingly, a motor of this type cannot be used for applications that require rotation of the driven shaft in the currentless state of the motor. One example of such an application is a throttle valve adjuster in internal combustion engines, in which for safety reasons a restoring spring assures that the throttle valve is always returned to the closing position if the throttle valve adjuster is without current.

OBJECT AND SUMMARY OF THE INVENTION

The vibration motor according to the invention, has an advantage over the prior art that the cooling, which ensues when the motor is without current, of the element that can change its shape as a function of temperature causes a pressing force between the stator and the rotor to disappear, enabling the rotor to rotate freely along with its driven shaft when the motor is without current. This opens up a number of new fields of application of the vibration motor, in which a driven shaft that rotates freely when the motor is without current is needed.

Advantageous further features of and improvements to the vibration motor defined herein are possible with the characteristics recited hereinafter.

In a preferred embodiment of the invention, a memory metal element with shaped memory, also known as a shape memory effect (SME) element, is used as the element that is of variable shape as a function of temperature. Such SME elements are known and are described for instance in an article by A. Fryatt entitled "Metall fuer Formgedaechtnis" [Metal for Shape Memory], Schweizer Maschinenmarkt [Swiss Engineering Market] No. 23/1982, page 60, or in German Offenlegungsschrift 38 09 909. SME elements with a one-way or two-way effect exist. With the one-way effect, the original shape is resumed only upon heating. The element must be brought to the other shape condition by external exertion of force (restoring element). In the two-way effect, a reversible temperature-dependent shape-changing behavior exists. In changing shape, these SME elements can perform work, for instance exerting positioning or adjusting forces.

In the vibration motor according to the invention, the embodiment of the SME element can be done in various ways. If it is embodied as a compression spring, then copper-based SME elements are preferably used. They exert their positioning forces in the compression direction. Above its shape-changing temperature, the compression spring resumes its original spring shape and can thus exert pressure forces upon the rotor. Below the shape-changing temperature, the compression spring contracts to solid length, or can be contracted to solid length by a restoring element, and it maintains this length until the shape-changing temperature is exceeded again.

If the SME element is embodied as a tension wire, then nickel-titanium (NiTi) alloys are used. NiTi elements exert their positioning force in a tensile direction, and above the shape-changing temperature they contract by a defined length. Below the shape-changing temperature, they can be lengthened to the original length again (one-way effect) or expand on their own (two-way effect).

Heating of the SME elements can be done either by direct supply of current or by means of a separate heating coil. Heating is always done in synchronism with the turn-on of the motor. When the motor is turned off, the heating current is switched off as well.

In another embodiment of the invention, the element of variable shape as a function of temperature is embodied as a thermostatic bimetal. A thermostatic bimetal element embodied as a cup spring is preferably used here, which when current flows through it effects a change in shape of the cup spring in the axial direction.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
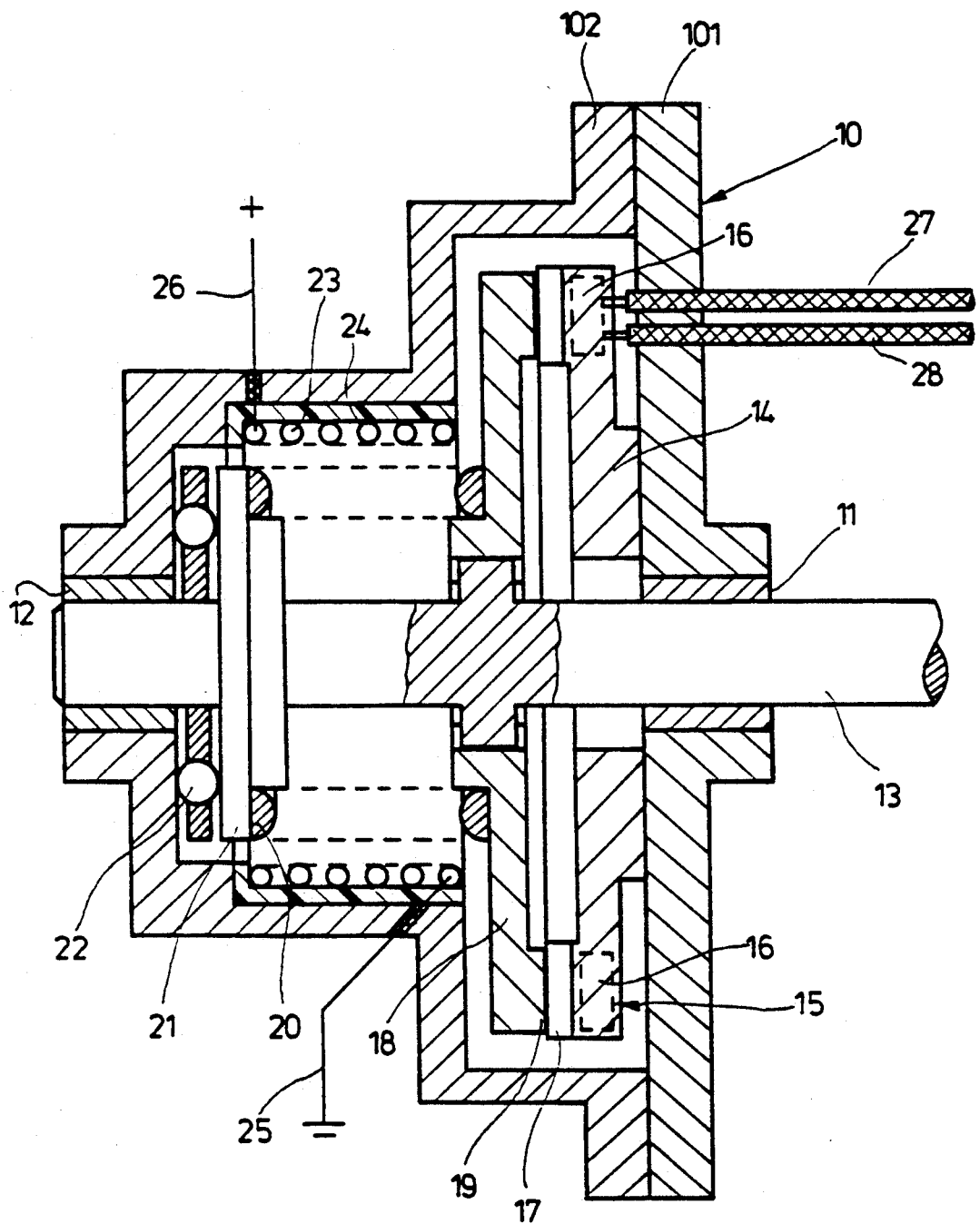
FIGS. 1-3 each show a longitudinal section through a vibration motor in accordance with a first, second and third exemplary embodiment, respectively.

The vibration motor or ultrasonic motor shown schematically in longitudinal section in FIG. 1 has a two-part motor housing 10, which comprises a base plate 101 and a housing cap 102 screwed onto the base plate 101. A radial bearing 11, 12 embodied as a slide bearing and in which the driven shaft 13 is supported is retained centrally in the base plate 101 and housing cap 102, respectively. A disk-shaped stator 14 with a through opening for the driven shaft 13 having an axially protruding annular collar 17 that carries a piezoelectric excitation system 15 is secured to the base plate 101 coaxially with the driven shaft 13. The piezoelectric excitation system 15, in a known manner, has a plurality of piezoelectric drive elements 16, which are disposed below the annular collar 17 circumferentially on the stator 14, offset by equal rotational angles. A disk-shaped rotor 18 is mounted on the driven shaft 13 in a manner fixed against relative rotation but axially displaceable and carries an annular collar 19, protruding axially toward the stator 14, the radial width of which is approximately the same as that of the annular collar 17 on the stator 14. The stator 14 and rotor 18 are pressed against one another, in the region of the annular collars 17, 19, by a compression spring 20 that is supported at one end on the rotor 18 and on the other on the flange 21 firmly joined to the driven shaft 13. In order to absorb the axial forces arising as a result in the radial bearings 11, 12, the flange 21 is supported on the bottom of the housing cap 102 via an axial bearing 22.

The compression spring 20 is made from memory metal, in this case brass. So-called memory metal elements with shape memory, also known as shape memory effect elements or SME elements are known, and so their function need not be described in further detail here. The compression spring 20 is an SME element with a two-way effect; that is, both above and below its shape-changing temperature of 70° C., for example, it assumes whichever shape is intended; thus a reversible process is brought about between two specified shape conditions of the compression spring 20. Below the shape-changing temperature, the compression spring 20 is compressed to solid length, while above the shape-changing temperature, it assumes its specified spring length. Because of this change in shape, the compression spring 20 is capable, above its shape-changing temperature, of acting upon the rotor 18 with an axial pressing force, thereby pressing the rotor against the stator 14. If the compression spring 20 contracts to solid length below its shape-changing temperature, then no axial force engages the rotor 18. To produce the shape-changing temperature, the compression spring 20 is coaxially surrounded by a cylindrical heating spiral 23, which is placed in an insulator sheath 24 secured in the motor housing 10. The heating spiral 23 can be connected to a source of heating current via supply lines 25, 26 passed through the housing cap 102 in an insulated manner. The switch, not shown here, for turning on the heating current for the heating spiral 23 is actuated in synchronism with the motor switch, so that the heating spiral 23 is turn-on solely during motor operation and is likewise without current if the motor is without current. The piezoelectric excitation system 15 is connected to an appropriate control apparatus via connection cables 27, 28 ducted through the base plate 101 in an insulated manner.

The mode of operation of the vibration motor is as follows:

In the currentless state of the motor, the rotor 18 is unmoving; the compression spring 20 is contracted to a solid length, and so exerts no axial force upon the rotor 18. The drive shaft 13 can be rotated without difficulty by means of a force engaging it from the outside, such as a restoring spring; only the forces of friction in the radial bearings 11, 12 need to be overcome.

When the motor is turned on, the heating spiral 23 receives current as well. The compression spring 20 warms up and tends to assume its original spring length above its shape-changing temperature, so that as a result the axial length of the compression spring 20 increases. The compression spring 20 is thus supported on the rotor 18 and presses it against the stator 14. When the motor is turned on, the piezoelectric excitation system 15 is triggered, which sets the stator 14 to vibrating, whereupon a rotating mechanical traveling wave is created at the stator 14, which carries the rotor 18, pressed against the stator 14 in slipfree fashion, along with it and thereby sets it to rotating. When the engine is shut off, the heating current for the heating spiral 23 is switched off as well. The compression spring 20 cools down, and below its shape-changing temperature contracts to a solid length. The pressing force between the rotor 18 and the stator 14 is cancelled.

The compression spring 20 may also be embodied as an SME element with a one-way effect. In that case, a restoring element should be provided, which when the compression spring 20 cools to below its shape-changing temperature compresses the compression spring 20 to a solid length. Such a restoring element may for instance be embodied by a tension spring, which is secured at one end to the rotor 18 and to the other to the flange 21.

Figure 2:
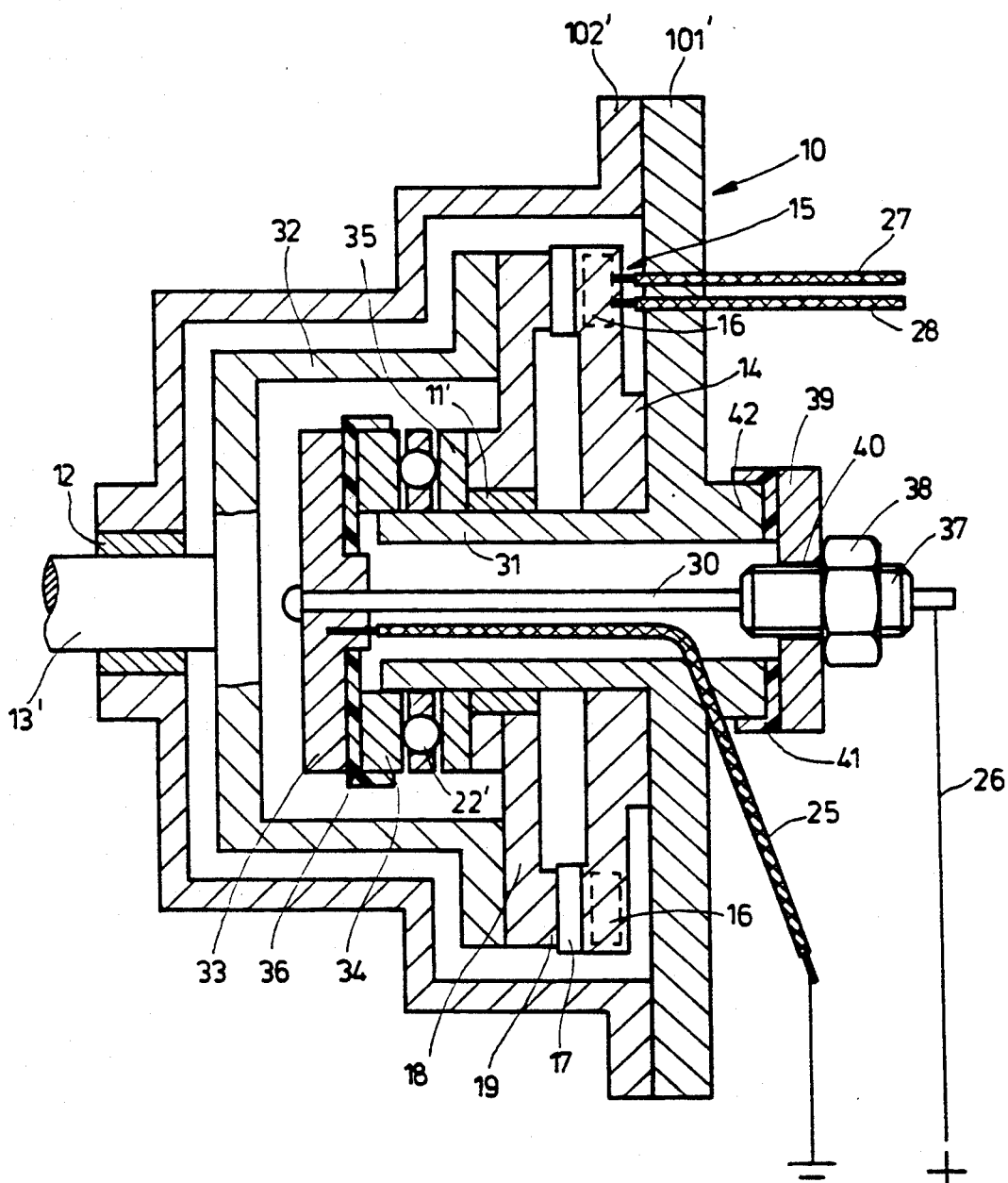

The vibration motor shown in longitudinal section in FIG. 2 differs from that of FIG. 1 essentially in that the pressing force that presses the rotor 18 against the stator 14 is produced in a different way. As a result, a slight modification in terms of structure is also necessary. To the extent that parts of the motor match those of FIG. 1, they are identified by the same reference numerals.

The pressing force between the rotor 18 and stator 14 is again brought to bear by a memory metal element, here embodied as a tension wire 30, which is preferably made from a nickel-titanium alloy. The tension wire 30, which again forms an SME element with a two-way effect, contracts by a predetermined axial length above its shape-changing temperature and is accordingly capable of exerting a tensile force. The base plate 101' of the motor housing 10 integrally includes a hollow-cylindrical bearing tang 31, which protrudes axially into the interior of the housing. The rotor 18 is supported on the bearing tang 31 by means of a radial bearing 11'. The driven shaft 13' is supported in a radial bearing 12 in the housing cap 102', and this bearing is disposed coaxially with the radial bearing 11'; the driven shaft is rigidly connected to the rotor 18 via a coupling bell 32, which fits over the bearing tang 31 in spaced-apart fashion. The tension wire 30 extends through the hollow-cylindrical bearing tang 31 and in the interior is secured to a pressing plate 33, which is supported on the rotor 18 via an axial bearing 22'. One intermediate ring 34 is disposed between the axial bearing 22' and the pressing plate 33, and another intermediate ring 35 is disposed between the axial bearing 22' and the rotor 18. An insulating disk 36 inserted between the intermediate ring 34 and the pressing plate 33 electrically insulates the pressing plate 33 from the intermediate ring 34. On the other end, the tension wire 30 is secured in a threaded bolt 37, onto which an adjusting nut 38 is screwed. The adjusting nut 38 is supported on a support plate 39 with a through opening 40 for the threaded bolt 37, which in turn is supported via an insulating disk 41 on an annular land 42 that protrudes outward from the base plate 101', coaxially with the bearing tang 31. For heating of the tension wire 30, a supply line 25 is ducted through the base plate 101 in insulated fashion and electrically connected to the pressing plate 33. A second supply line 26 is connected to the threaded bolt 37 or to the tension wire 30 ducted through the threaded bolt 37. The two supply lines 25, 26 are connected, via a switch not shown here, to a source of heating current. Otherwise, the structure of the motor matches that of FIG. 1.

If the motor is currentless, the tension wire 30 assumes its predetermined axial length, which can be adjusted by means of the adjusting nut 38 such that the pressing plate 33 rests without play on the rotor 18, via the axial bearing 22', without exerting an axial force on the rotor. When the motor is switched on, the heating current source is switched on as well, and the tension wire 30 is heated. When it exceeds its shape-changing temperature, the tension wire 30 shortens and in so doing exerts a tensile force upon the pressing plate 33. This plate in turn generates an axial pressure force that presses the rotor 18 upon the stator 14. Because of the slipfree connection between the rotor 18 and the stator 14, the rotor 18 is set to rotating. After the motor is switched off, the heating current through the tension wire 30 is switched off as well. The tension wire cools down and lengthens, below its shape-changing temperature. The rotor 18 can again rotate freely relative to the stator 14.

Once again, the tension wire 30 can be embodied as a memory metal element with a one-way effect. In that case, a restoring element must be provided, that the tension wire 30, below its shape-changing temperature, stretches out to its original length again. Such a restoring element can for instance be achieved by means of a compression spring, which is supported in insulated fashion at one end on the pressing plate 33 and at the other on the support plate 39.

Figure 3:
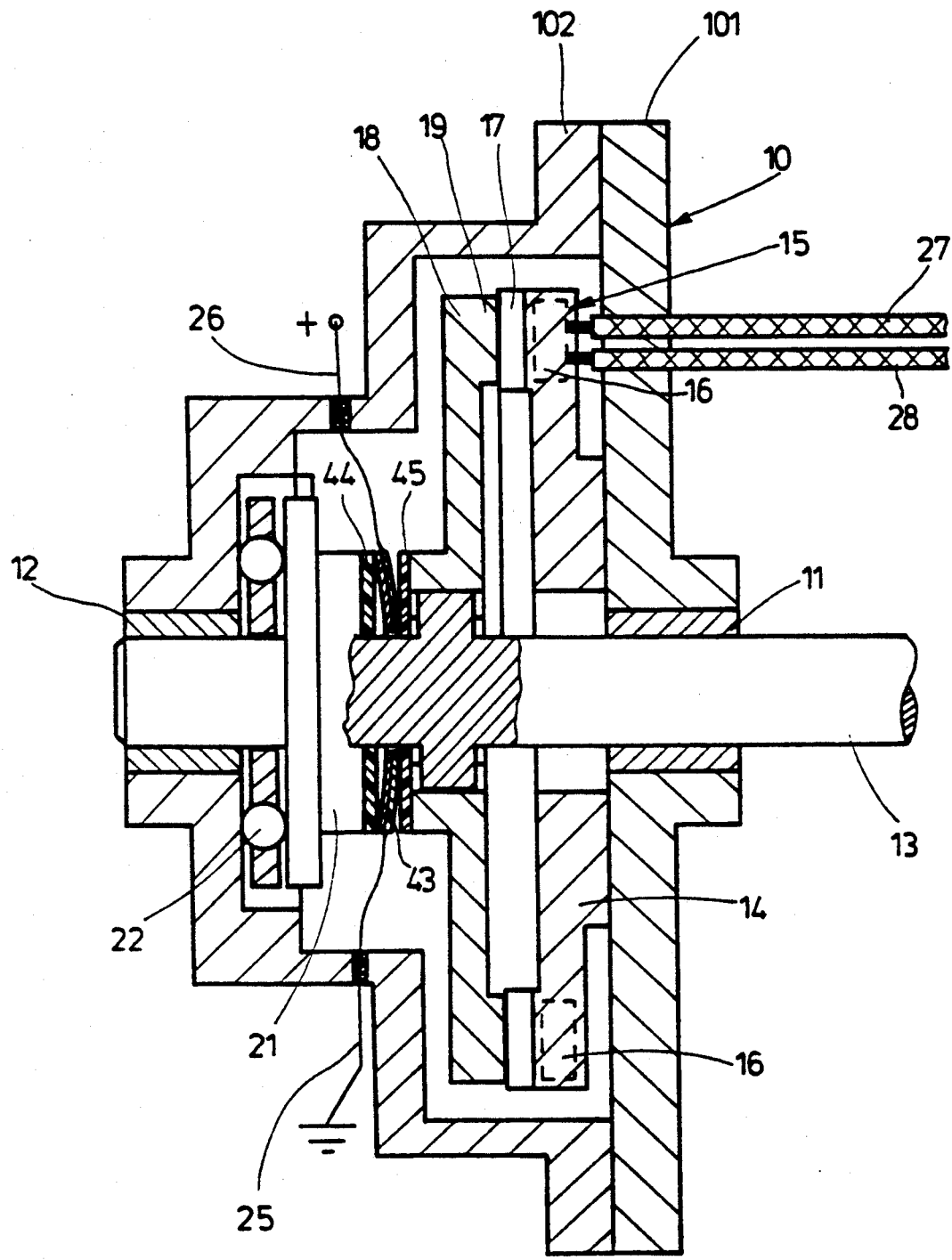

The vibration motor shown in longitudinal section in FIG. 3 is virtually identical in structure to the vibration motor of FIG. 1, and so identical components are again provided with the same reference numerals. The pressing force between the rotor 18 and stator 14 is produced here by means of a cup spring 43, which is embodied as a thermostatic bimetal element. The cup spring 43 is supported, via an interposed insulating disk 44, 45, respectively, on the rotor 18 at one end and on the flange 21 of the driven shaft 13 on the other. Via supply lines 25 and 26, which are ducted in insulated fashion through the housing cap 102, the cup spring 43 is connected to a source of heating current, which is connected or disconnected in synchronism with the turn-on and turn-off of the motor. Below its shape-changing temperature, the cup spring 43 is approximately stretched and lies without play and without pressure between the rotor 18 and the flange 21. Above its shape-changing temperature, the cup spring 43 curves in the manner shown in FIG. 3, and because of its shape change presses the rotor 18 sliplessly against the stator 14. The mode of operation of the vibration motor is the same as that described above.

To assure free travel of the driven shaft 13 when the motor is without current, it is naturally possible to divide the driven shaft 13 into two shaft segments and to join them together via an electromagnet coupling. The rotor 18 is then mounted on one of the shaft segments and is permanently pressed against the stator 14 by a compression spring. The shaft segment, coupled via the electromagnet coupling, protrudes out of the motor housing and forms an adjusting shaft, for instance. The electromagnet coupling is turned on and off in synchronism with the motor. This kind of structural provision of the free travel is far less satisfactory, in terms of manufacturing costs and structural volume, than the above-described versions, however.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A vibration motor having a disk-shaped stator containing a piezoelectric excitation system, having a disk-shaped rotor aligned parallel to the stator and mounted on a driven shaft in a manner fixed against relative rotation on the driven shaft, and having a pressing element that presses the rotor axially against the stator, the pressing element is embodied as a force-transmitting element that is changeable in shape as a function of temperature, which during motor operation the pressing element is held at a temperature above a temperature point at which the shape change ensues and said pressing element is disposed such that the pressing force between the rotor and the stator becomes less as a result of the shape change beginning when the temperature drops below the aforementioned temperature point.

2. A motor as defined by claim 1, in which the pressing element that changes its shape as a function of temperature is a memory metal element with shape memory, or shape memory effect element.

3. A motor as defined by claim 2, in which the SME element is a compression spring (20), which below its temperature change point for the shape change is compressed to approximately a solid length, and above this temperature point expands to its spring length, and that the compression spring (20) is supported at one end on the axially displaceable rotor (18) and at the center on a flange 21 fixedly secured to the driven shaft (13).

4. A motor as defined by claim 3, in which the compression spring (20) is surrounded by a coaxial heating spiral (23) which has a heating output designed such that the temperature point for the shape change of the compression spring (20) is exceeded by supplying current to the heating spiral (23).

5. A motor as defined by claim 2, in which the SME element is a tension wire (30), which above its temperature change point for the shape change compresses to a smaller axial length, and below this temperature point the tension wire (30) expands to the original length; that the tension wire extends within a hollow-cylindrical bearing tang (31) on which the rotor (18) is axially displaceable; and that the tension wire (30) is fastened at one end to an adjustable bolt (37) and at the other end to a pressing plate (33), which is supported on the rotor (18) via an axial bearing (22') held on the bearing tang (31).

6. A motor as defined by claim 5, in which the tension wire (30), comprises a nickel-titanium allow, dimensioned such that when a current flows through it, the tension wire is heated such that a shape change takes place when current is supplied to the tension wire (30).

7. A motor as defined by claim 5, in which the driven shaft (13') is held in a radial bearing (12), that is in alignment with the bearing tang (31) and is connected to the rotor (18) in a manner fixed against relative rotation, via a coupling bell (32) that fits over the pressing plate (33), axial bearing (22') and bearing tang (31).

8. A motor as defined by claim 6, in which the driven shaft (13') is held in a radial bearing (12), that is in alignment with the bearing tang (31) and is connected to the rotor (18) in a manner fixed against relative rotation, via coupling bell (32) that fits over the pressing plate (33), axial bearing (22') and bearing tang (31).

9. A motor as defined by claim 1, in which the element that changes its shape as a function of temperature is a thermostatic bimetal element (43).

10. A motor as defined by claim 9, in which the thermostatic bimetal element is embodied as a cup spring (43), which is supported at one end via an insulating disk (45) on the rotor (18) and at the other end via an insulating disk (44) on the driven shaft (13), and that the disposition of the cup spring (43) is effected such that an axial length increases when current flows through it to produce heat.

11. A motor as defined by claim 3, having a housing surrounding the rotor and stator, in which the driven shaft (13) supports an abutment for the flange (21) that supports the compression spring (30), which flange is supported on the motor housing (10) via an axial bearing (22).

12. A motor as defined by claim 10, having a housing surrounding the rotor and stator, in which the driven shaft (13) supports an abutment for the flange (21) that supports the compression spring (30) which flange is supported on the motor housing (10) via an axial bearing (22).

13. A motor as defined by claim 3, having a housing surrounding the rotor and stator, in which the driven shaft (13) supports an abutment for the flange (21) that supports a cup spring (43), which flange is supported on the motor housing (10) via an axial bearing (22).

14. A motor as defined by claim 10, having a housing surrounding the rotor and stator, in which the driven shaft (13) supports an abutment for the flange (21) that supports cup spring (43), which flange is supported on the motor housing (10) via an axial bearing (22).

* * * * *